Figure 1:
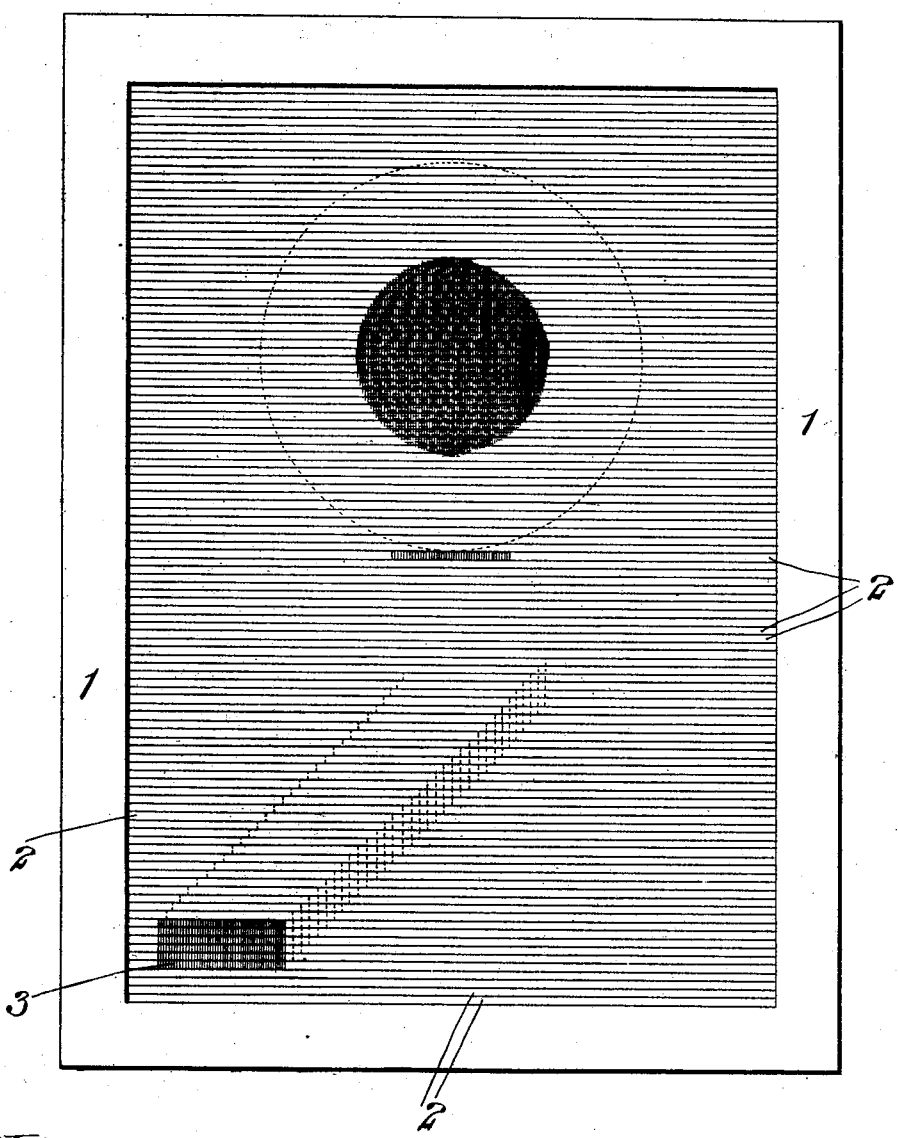

No. 762,519. PATENTED JUNE 14, 1904.
H. A. FARRAND.
APPARATUS FOR PRODUCING MOVING PICTURES.
APPLICATION FILED JUNE 30, 1903.
NO MODEL. 4 SHEETS—SHEET 2.

Witnesses: George Barry Jr.
Henry Thieme

Inventor:
Hiram A. Farrand
by attorneys
Brown & Seward

No. 762,519. PATENTED JUNE 14, 1904.
H. A. FARRAND.
APPARATUS FOR PRODUCING MOVING PICTURES.
APPLICATION FILED JUNE 30, 1903.
NO MODEL. 4 SHEETS—SHEET 3.
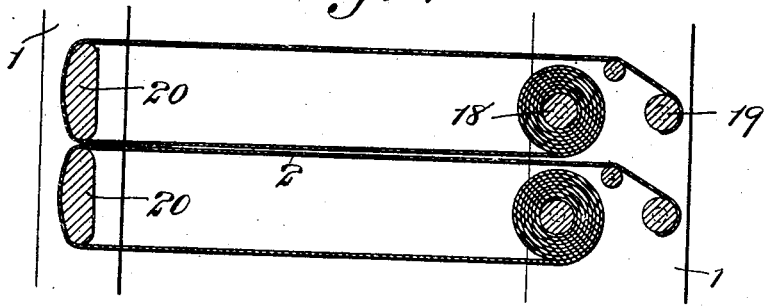
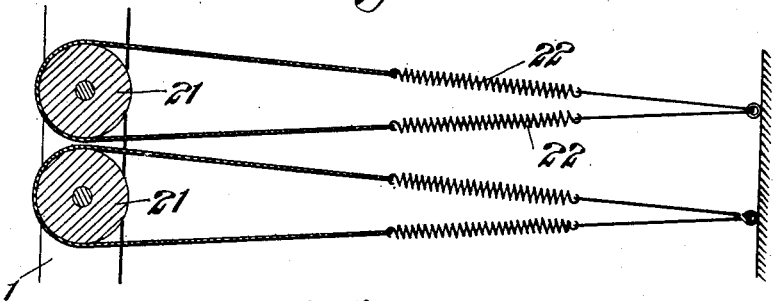
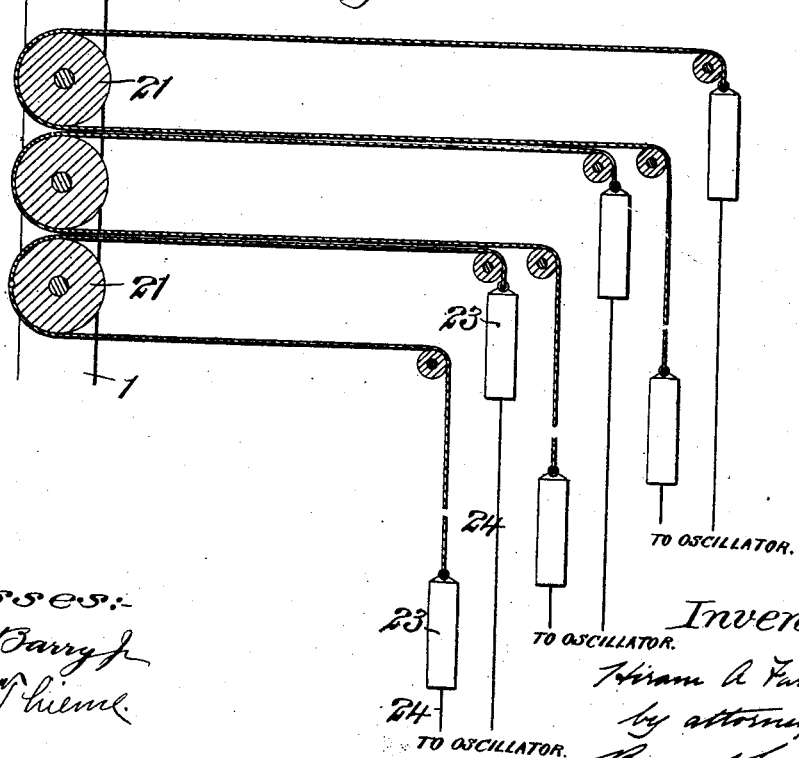
Witnesses:
George Barry Jr
Henry Thieme
Inventor:
Hiram A. Farrand
by attorneys
Brown & Seward No. 762,519. PATENTED JUNE 14, 1904.
H. A. FARRAND.
APPARATUS FOR PRODUCING MOVING PICTURES.
APPLICATION FILED JUNE 30, 1903.
NO MODEL. 4 SHEETS—SHEET 4.

Witnesses:
George Barry Jr.
Henry Thieme

Inventor.
Hiram A. Farrand
by attorneys

No. 762,519.

Patented June 14, 1904.

UNITED STATES PATENT OFFICE.

HIRAM A. FARRAND, OF NEW YORK, N. Y.

APPARATUS FOR PRODUCING MOVING PICTURES.

SPECIFICATION forming part of Letters Patent No. 762,519, dated June 14, 1904.

Application filed June 30, 1903. Serial No. 163,686. (No model.)

*To all whom it may concern:*

Be it known that I, HIRAM A. FARRAND, a citizen of the United States, and a resident of the borough of Manhattan, in the city and State of New York, have invented new and useful Improvements in Apparatus for Producing Moving Pictures, of which the following is a specification.

My invention relates to improvements in apparatus for producing moving pictures, and has for its object to provide an apparatus for the production of the illusion of moving or changing pictures without the use of artificial light, projecting lanterns or lenses, or the obtrusion of moving parts between the point of observation and the picture-plane.

My invention further has for its object to materially simplify apparatus of this character without diminishing the illusory effect of moving pictures.

In apparatus for producing moving pictures heretofore known the moving pictures have been produced by employing a series of unit images to represent the changes taking place— that is to say, a series of whole or integral pictures are caused to enter and occupy the picture-plane one after the other, each picture being a part of the series progressively arranged, and the illusion is produced not through any contortion or action of these pictures within themselves, but by the rapid succession of the altered pictures arranged in proper series.

My improved apparatus contemplates the production of a picture-plane by providing a plurality of moving surfaces arranged to have different elements of the surfaces brought into and out of the picture-plane, the elements of surface of the several moving surfaces in the picture-plane serving to complete a picture the configuration of which changes as the surfaces are brought into and out of the picture-plane.

In my improved apparatus the picture-plane is divided into a plurality of comparatively small sections, each section having the proportionate part of the changes that are to take place in the picture-plane.

Practical embodiments of my invention are represented in the accompanying drawings, in which—

Figure 2:
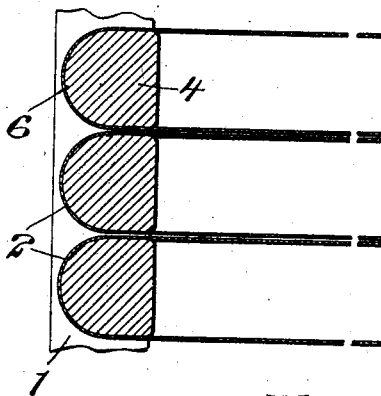
Figure 3:
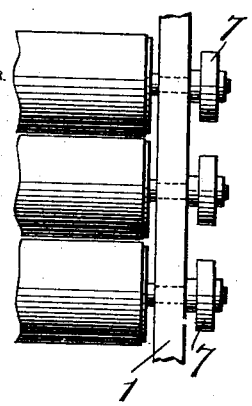
Figure 4:
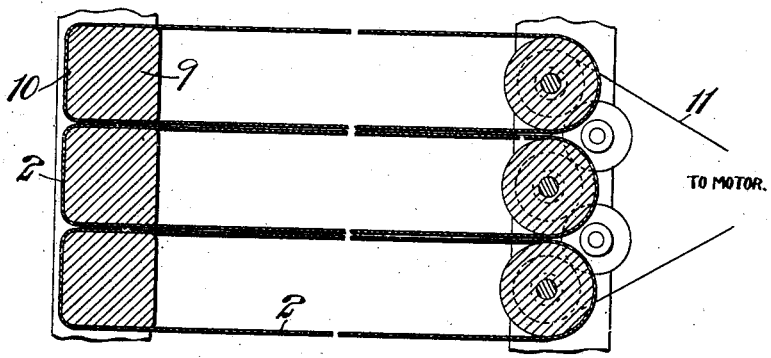
Figure 5:
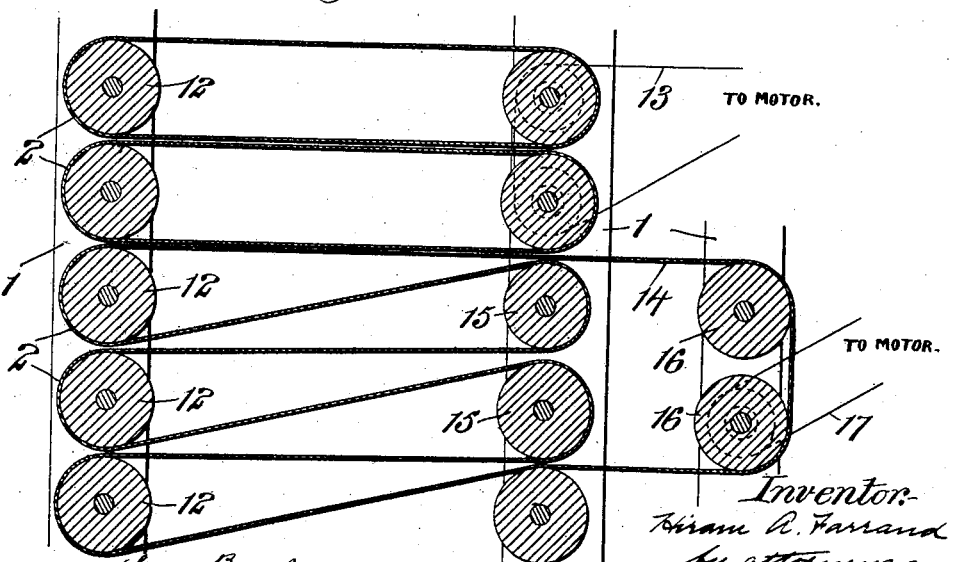
Figure 9:
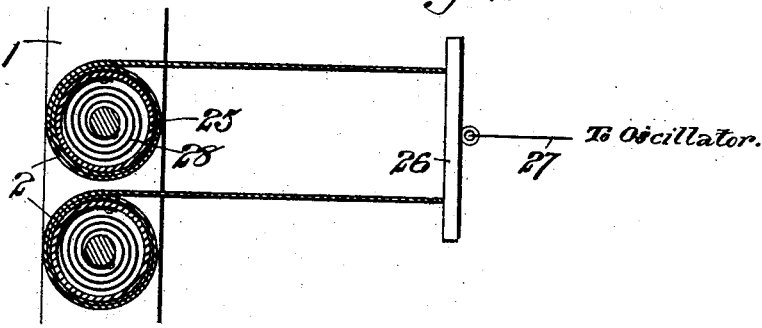
Figure 10:
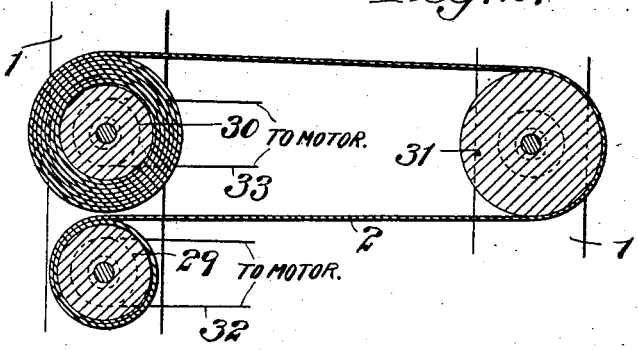
Figure 11:
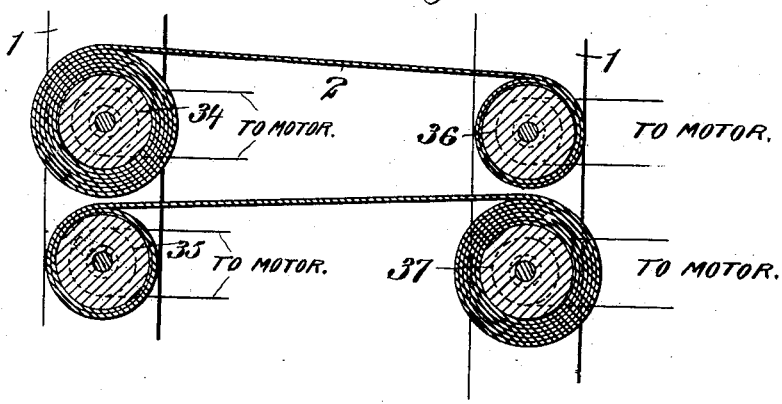

Figure 1 represents a frame inclosing a picture-plane consisting of a plurality of moving surfaces formed by aprons, elements of surface of which are brought into and out of the picture-plane by suitable mechanism. Fig. 2 represents, on an enlarged scale, in longitudinal vertical section, three endless moving aprons the surfaces of which are arranged to be brought into and out of the picture-plane, each apron being independently driven by a motor. Fig. 3 is a partial front view of the same. Fig. 4 represents three endless aprons driven from a common motor. Fig. 5 is a similar view showing a pair of endless aprons driven by a common motor and a single apron arranged to have three distinct elements of its surface brought into the picture-plane at the same time adjacent to each other. Fig. 6 is a similar view showing two aprons arranged to be wound onto and unwound from two rollers by the alternate driving of one or the other of the rollers. Fig. 7 shows two reciprocating aprons having a yielding counterbalance attached to the ends thereof. Fig. 8 shows three reciprocating aprons having counterbalance-weights attached to their ends. Fig. 9 represents two aprons having their outer ends attached to a spring-actuated retracting-roller and their inner ends attached to a common device leading to an oscillator. Fig. 10 represents a single apron arranged to have its opposite faces brought into the picture-plane at adjacent points; and Fig. 11 represents two adjacent aprons having their outer ends attached to rollers in the picture-plane and their inner ends attached to rollers driven by motors, the aprons being so arranged that as one apron is wound upon its outer roller the other apron will be wound upon its inner roller, thus keeping the elements of surface of the two aprons in the picture-plane in close proximity to each other at all times.

The frame represented in Fig. 1 is denoted by 1 and may be of any desired shape and size, that shown herein being of rectangular form.

The picture-plane is formed by the exposure of the outer ends of a large number of aprons 2, arranged in very close proximity to each other, so as to produce the illusion of a substantially plain surface when viewed from a short distance.

So small is the width of the exposed element of surface of each apron 2 that the value of it is but little more than that of a good broad line in a drawing when the element of surface is viewed from a little distance.

Each apron 2 is provided with its particular part 3 of the completed figure to be presented in the picture-plane. These portions 3 of the figure to be presented are so placed upon the aprons 2 that as the aprons are moved to bring different elements of surface into the picture-plane the portions 3 will be brought into such a relation with each other that the configuration of the figure presented on the picture-plane will be changed as the aprons are moving, thus giving the illusion of a moving picture. Take, for instance, the small circular field represented in Fig. 1 by the exposed elements of surface of a number of the aprons 2. Each apron-surface is so arranged that as all of the aprons are moved together the circular field may be gradually enlarged at all points out to the dotted line, additional aprons being brought into use as the field enlarges. Again, a single apron may be so marked that the short straight line shown on the exposed element of surface of one of the aprons may be gradually lengthened in both directions to the dotted lines as the apron is moved. The rectangular figure represented by the exposed elements of surface of several aprons near the lower corner of the frame 1 may be apparently moved upwardly in a diagonal direction across the face of the picture-plane by arranging the portions 3 on the several aprons in the desired positions. These three examples shown, it is believed, are sufficient to clearly illustrate the operation of the apparatus.

While the outline of the figure when viewed very closely may be irregular, the number of aprons is preferably so great as to produce a rectangular-outline effect when the picture-plane is viewed from a little distance.

It is obvious that by the proper grouping of the portions 3 on the several aprons any figure or display representation may be built up and presented to view in the picture-plane by the proper manipulation of the several aprons.

It is to be understood that the movement of the aprons 2 may be controlled, so that they may be caused to be moved at different speeds or in unison or any one or more of them to be stopped, as may be desired, to produce different effects. Furthermore, the aprons may be moved in the same direction or in opposite directions, as may be desired.

In the accompanying drawings I have represented a number of different ways in which the aprons may be brought into and out of the picture-plane.

In Fig. 2 I have represented an endless apron, which passes around a block 4 at the front of the frame and a roller 5 at the rear of the frame. The outer face of the block 4 is curved, as shown at 6. The shaft of the roller 5 is provided with a pulley 7, from which a belt 8 leads to a motor of any well-known or approved form. The several belts may be independently driven or may be driven at the same speed, if so desired.

In Fig. 4 I have shown the blocks 9 at the front of the frame as provided with straight faces 10 and have also shown the several aprons driven in unison by a belt 11, leading to a common motor.

In Fig. 5 I have represented rollers 12 at the front of the picture-frame, around which the aprons are passed to reduce the frictional drive of the same. In this figure I have represented the upper two aprons as being driven in unison by a belt 13, driven by a common motor. In this figure I have also shown an endless apron 14 of considerable length, which passes around three of the front rollers 12, two intermediate rollers 15, and two back rollers 16, one of which rollers 16 is driven by a belt 17, leading to a motor.

In Fig. 6 I have represented two aprons of a series having their ends attached to outer and inner rollers 18 and 19 and passing around oval-faced blocks 20 at the front of the frame. These aprons may be reciprocated by any well-known means. (Not shown herein.)

In Fig. 7 I have represented the aprons as passing around rollers 21 at the front of the frame, the ends of the aprons being attached to counterbalance-springs 22, so as to permit the aprons to be reciprocated by any well-known means and at the same time keep them snugly in position on the rollers 21.

In Fig. 8 I have represented the belts as passing around the rollers 21 at the front of the frame and as having counterbalance-weights 23 attached to their ends and flexible connections 24 leading to any suitable oscillator arranged to reciprocate the aprons.

In Fig. 9 I have represented the outer ends of the aprons as attached to spring-actuated retracting-rollers 25 and their inner ends as attached to a common device 26, which in turn is connected to any well-known oscillator by a connection 27. This form is only adapted for limited displays, the spring 28 of each roller being sufficient to wind up the apron on the roller after it has been withdrawn by the oscillator.

In Fig. 10 I have shown a device in which both faces of the apron may be exposed in the picture-plane at points adjacent to each other, one roller, 29, at the front of the frame being arranged to wind up the apron as the other roller, 30, at the front of the frame unwinds the apron therefrom. A roller 31 is arranged at the back of the frame, around which the apron passes. The rollers 29 and 30 may be provided with means for rotating them to wind up the apron—as, for instance, belts 32 33, leading to suitable motors.

In Fig. 11 I have represented aprons having their outer ends attached to rollers 34 35 at the front of the frame and their inner ends attached to rollers 36 37 at the rear of the frame. The aprons are so wound that when one apron is being wound upon the roller 34 the other apron is being wound upon the roller 37, thus keeping the distance between the exposed elements of surface of the two aprons in the picture-plane at a minimum. These several rollers may be rotated at the required speeds by belts leading to suitable motors.
It is evident that numerous changes might be made in the construction, form, and arrangement of the several parts of the apparatus herein shown and described without departing from the spirit and scope of my invention. Hence I do not wish to limit myself to the forms shown and described herein; but

What I claim is—

1. A moving-picture apparatus having a picture-plane made up of a plurality of surfaces and means for moving the surfaces into and out of the picture-plane, the said surfaces having representations thereon arranged to coact with one another during the movement of the surfaces into and out of the picture-plane to produce a moving-picture effect.

2. A moving-picture apparatus having a picture-plane composed of a plurality of aprons and means for moving the aprons into and out of the picture-plane, the faces of the aprons having representations thereon arranged to coact with one another during the movement of the surfaces into and out of the picture-plane to produce a moving-picture effect.

In testimony that I claim the foregoing as my invention I have signed my name, in presence of two witnesses, this 26th day of June, 1903.

HIRAM A. FARRAND.

Witnesses:
 FREDK. HAYNES,
 C. S. LUNDGREN.